June 22, 1965                A. S. VOLPIN                3,190,304
         AUTOMATIC PLASTIC-SEALED VALVE WITH TWO-STAGE SEALING
Filed Jan. 31, 1963                              2 Sheets-Sheet 2
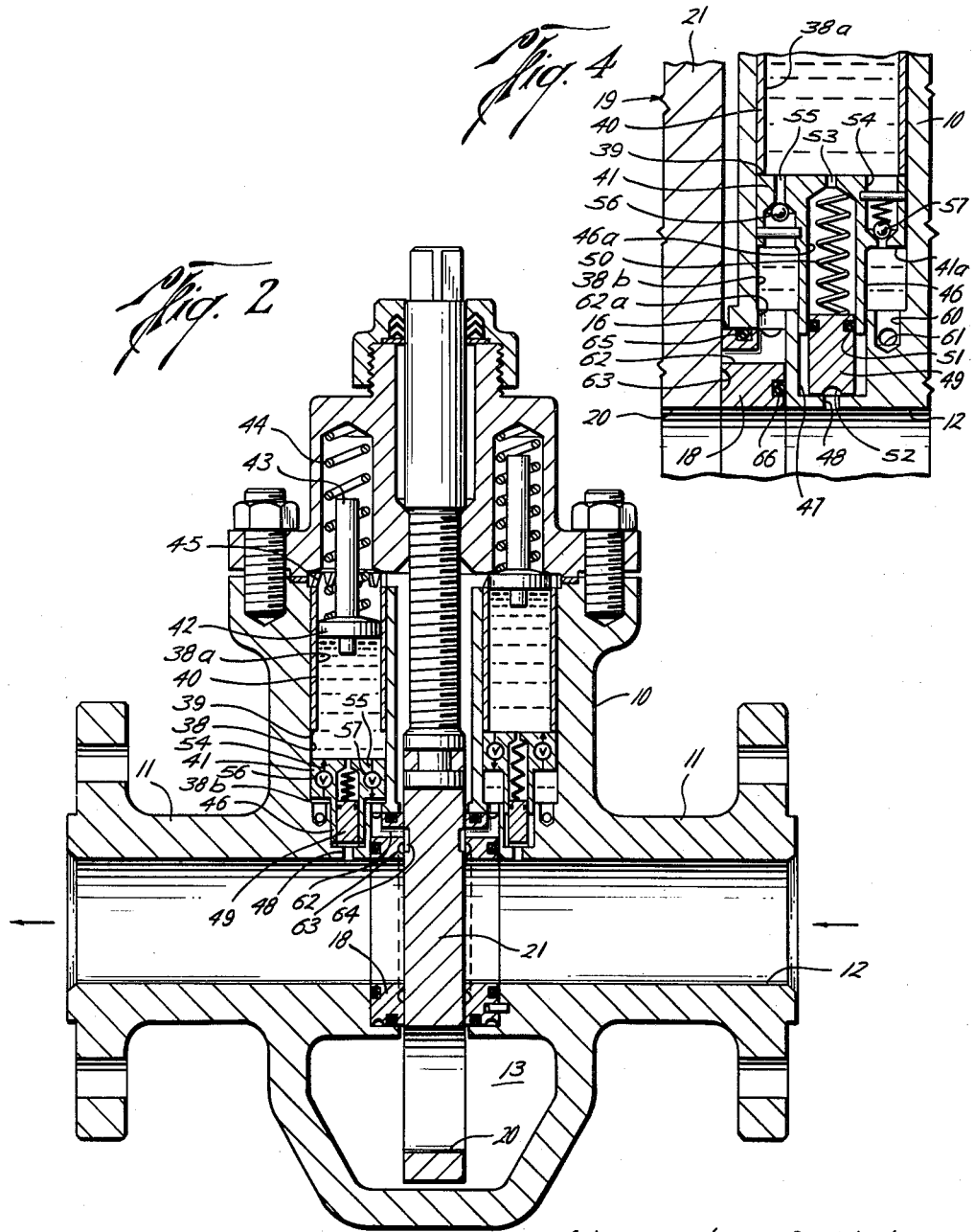
Alexander S. Volpin
INVENTOR.
BY
ATTORNEY

United States Patent Office 3,190,304
Patented June 22, 1965

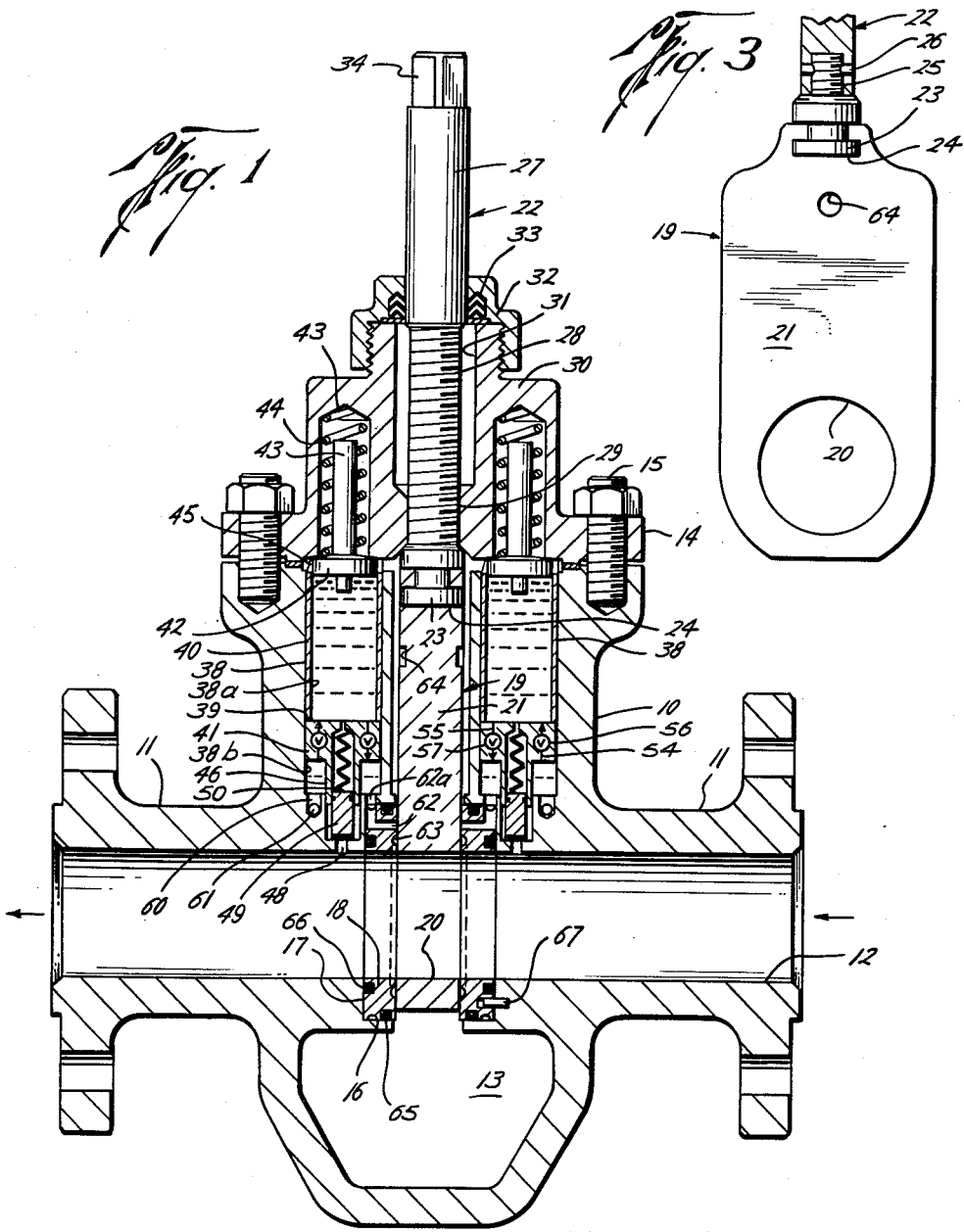

3,190,304
AUTOMATIC PLASTIC-SEALED VALVE WITH TWO-STAGE SEALING
Alexander S. Volpin, 10200 W. Broadview Drive, Miami Beach, Fla.
Filed Jan. 31, 1963, Ser. No. 255,360
4 Claims. (Cl. 137—246.12)

This invention relates to improvements in automatic plastic-sealed valves.

In automatic plastic-sealed valves, flowable or plastic sealant material is forced automatically from storage reservoirs into sealing groove systems disposed about the flowway between the closure member and valve seat. In most such valves the sealing is effected on the downstream side of the valve. The actuating force upon the sealant is differential fluid pressure developed across the closure member when it is moved to the flowway-closing position.

It is desirable in all instances that as the closure member attains the flowway-closing position, the sealant should fill the groove system very quickly in order to assure a complete and effective seal. This is particularly important in the case of valves for large diameter pipes. In such cases, the sealing groove system is of considerable length and requires a substantial volume of sealant to completely fill it.

The present invention has for its primary object the provision of a sealant supply system which will effectively meet the requirements for automatic sealing in valves of the type just described.

In accordance with this invention, the usual reservoir containing the sealant and communicating with the sealing groove system is provided with a pair of spaced-apart slidable pistons or barrier members and two bodies of sealant, one between the barrier members and the other between the lower barrier member and the groove system, operable so that not only will rapid filling of the sealing groove be effected, but a supplemental supply of sealant will always be available to assure filling of the sealing groove system rapidly and efficiently.

A further object is the provision of a reservoir system for automatic sealing in a valve of the general character described, wherein the reservoir is provided with an upper and lower piston or barrier member which are resiliently biased toward each other, the lower barrier providing the initial charge of sealant to the sealing groove system, while the upper barrier directs the pressure differential forces across the valve through the intervening body of sealant to the lower barrier for providing the necessary force to actuate the latter and at the same time providing the supplemental body of sealant to assure effective filling of the sealing groove system.

A more specific object is the provision on the lower barrier member of unbalanced pressure areas on the upper and lower sides of the barrier member so as to assure rapid movement of the lower barrier member in the direction of forcing sealant to the sealing groove system under the pressure differential across the closed valve.

Another object is the provision in the lower barrier member of a check valve-contolled passageway for transmitting sealant from the reservoir portion between the barrier members to the reservoir portion beneath the lower barrier member.

Yet another object is the provision in the lower barrier member of a pair of check valve-controlled passageways arranged to direct sealant flow in opposite directions through the lower barrier member between the reservoir portions above and below the lower barrier member.

Other and more specific objects and advantages of this invention will become more readily apparent from the following detailed description when read in conjunction with the accompanying drawing which illustrates a useful embodiment in accordance with this invention.

In the drawing, FIG. 1 is a longitudinal vertical crosssectional view of a gate valve embodiment in accordance with this invention, the closure member being shown in the flowway-opening position;

FIG. 2 is a view similar to FIG. 1, showing the closure member in the flowway-closing position;

FIG. 3 is an elevational view of one side of the closure member including a fragmentary, partly sectional view of the operating stem and its connection to the closure member; and FIG. 4 is a fragmentary view, in section, showing on an enlarged scale the details of the lower barrier pistons and the related connections to the flowway and the sealing groove system.

Referring to the drawing, the valve in the embodiment illustrated is of the through-conduit, rising stem, gate-type and comprises a housing 10 having coaxially opposed flow ports 11—11 defining the flowway 12 which is intersected interiorly of the housing by the gate chamber 13. The upper end of chamber 13 is closed by means of a bonnet 14 which is removably secured to the upper end of the housing by means of the studs 15. The inner ends of flow ports 11 have annular recesses 16 defined by the bottom walls 17 surrounding the flowway. Annular gate seats 18 are removably seated in recesses 16.

A gate, designated generally by the numeral 19, is disposed in chamber 13 for vertical reciprocation across the flowway 12 between gate seats 18—18. Gate 19, in the illustrative embodiment, is of one piece, generally rectangular, flat sided construction, the side faces being slidably engageable with the opposed outer end faces of seats 18—18. The gate is provided, near its lower end, with a transverse opening 20 adapted to register with flowway 12 when the gate is in the raised or flowway-opening position, as seen in FIG. 1. The upper portion of the gate forms the closure section 21 which is adapted to cut off flow through flowway 12 when the gate is in the lower or flowway-closing position, as seen in FIG. 2.

Gate 19 is reciprocated by means of a stem, designated generally by the numeral 22, which is secured to the upper end of the gate by means of an inverted T-shaped head 23 slidably received in a correspondingly shaped slot 24 provided centrally in the upper end of gate 19. Head 23 is threadedly secured to the lower end of stem 22 by means of a threaded pin 25 (FIG. 3), the latter being locked to the stem by means of a cross-pin 26 which extends through suitable registering openings in pin 25 in stem 22. Stem 22 has an upper, generally cylindrical portion 27 and a lower threaded section 28. The latter is threadedly received through a threaded opening 29 in bonnet 14, whereby as the stem is rotated, engagement of the threads on section 28 in the threads provided in opening 29, will reciprocate the gate in a direction depending upon the direction of rotation. Bonnet 14 has an upwardly extending neck 30 which forms a stuffing box 31 about the stem and is closed at its upper end by means of a tubular cap 32 which surrounds cylindrical portion 27 of the stem and is threadedly secured to the upper end of neck 30. Packing 33 is disposed in cap 32 about portion 27 of the stem to seal the upper end of the stuffing box. The upper end of stem 22 is provided with a portion 34 of polygonal shape for attachment of a conventional operator, such as a handwheel or the like.

Housing 10 has formed therein a pair of sealant reservoirs 38—38 vertically disposed on opposite sides of gate 19. Reservoirs 38 form parts of automatic plastic sealant systems for sealing between seats 18 and the adjacent sides of the gate. These sealing systems are identical and are generally symmetrically arranged with respect to the gate, the dual systems being provided so that either end of the valve may function as the upstream or the downstream end, depending upon the orientation of the valve in the pipe line into which it is connected. For purposes of this description, since both sealing systems are identical, the sealing system for one side of the valve will be described in detail, it being understood that the description will thus apply to both sealing systems.

Reservoir 38 is provided at an intermediate point therein with an internal shoulder 39, as by means of a tubular liner 40 which extends from the upper end of reservoir 38 to a point spaced from its lower end. The portion of reservoir 38 which is above shoulder 39 may be referred to as the upper reservoir 38a and the portion of the reservoir below shoulder 38 may be referred to as lower reservoir 38b. The reservoir portions are separated by a lower slidable piston or barrier member 41 which is limited in its upward movement by shoulder 39. An upper piston or barrier member 42 is slidably disposed in upper reservoir portion 38a and has an upwardly projecting stem 43 which extends into a vertically disposed registering recess 44 provided in bonnet 14 and closed at its upper end. A coil spring 44 is mounted about stem 43 in compression between the closed upper end of recess 43 and upper barrier member 42, being operative to resiliently bias upper barrier member 42 downwardly in upper reservoir portion 38a. The upper end of upper reservoir portion 38a is open to the interior of gate chamber 13, the upper end of liner 40 being provided with serrations 45 or other suitable openings for admitting pressure from the interior of the chamber into upper reservoir portion 38 above barrier member 42.

As best seen in FIG. 4, lower barrier member 41 has a central downwardly extending tubular extension 46 having a bore 46a, which is slidably receivable in a cylinder or socket 47 formed in the wall of port 11 outwardly of seat 18. The bottom of socket 47 is in communication with flowway 12 through a port 48. A cylindrical plug 49 is slidably mounted in bore 46a and a coil spring 50 is mounted in bore 46a in compression between the upper end of bore 46a and the inner end of plug 49, thereby biasing barrier member 41 upwardly relative to plug 49. An annular seal, such as an O-ring 51, is mounted about the upper end of plug 49 to provide a fluid-tight seal between the upper end of plug 49 and the wall of bore 46a. A cross groove 52 is provided across the bottom of plug 49 to communicate with port 48. A port 53 provides communication between the interior of upper reservoir portion 38a and the interior of bore 46a. Extension 46 is made somewhat greater in length than the maximum distance between the lower face 41a of barrier member 41 and the bottom of lower reservoir portion 38b, so that a portion of extension 46 will always be within recess 47. The length of plug 49 is made so that when lower barrier member 41 is at the upper limit of its movement against shoulder 39, the sealed upper end of plug 49 will be within bore 46a, thereby maintaining the internal seal between plug 49 and extension 46. Lower barrier member 41 is provided with inlet and outlet passageways 54 and 55, respectively, extending through the barrier member to provide communication therethrough between reservoir portions 38a and 38b. Inlet passageway 54 is provided with a spring-loaded check valve 57 to restrict flow toward reservoir portion 38a from reservoir portion 38b, while outlet passageway 55 is provided with check valve means 56 restrictitng flow in the opposite direction. It will be evident that by the arrangement providing the hollow extension 46 on lower barrier member 41, which is relatively movable with respect to the sealed closure plug 49, the pressure-effective area of the lower side of barrier member 41 will be the annular area surrounding extension 46 which will be substantially less than that of the upper side of the barrier member, the entire area of which will comprise its pressure-effective area. This difference in areas has an important function as will appear subsequently.

A channel 60 is provided in the wall of housing 10 communicating with the interior of the lower reservoir portion 38b through the bottom thereof and is also in communication with a passage 61 leading to the exterior of the housing, through which flowable or plastic sealant may be injected into lower reservoir portion 38b from the exterior of the housing by means of a conventional pressure fitting (not shown).

Seat 18 is provided with a passage 62 communicating at one end with the interior of reservoir portion 38b through a port 62a and at the other end with the outer end face of the seat which is engageable with the gate face. The outer end face of seat 18 is provided with an annular sealing groove 63 which is spaced a short distance radially inwardly from the outer end of passage 42 and is continuous about flowway 12. In the flowway-opening position of gate 19 (FIG. 1), communication between passage 62 and groove 63 will be cut off by the intervening portion of seat 18. However, in the flowway-closing position of the gate (FIG. 2), the latter is provided with a circular bridging recess 64 which is adapted to span the portion of the inner end face of seat 18 which intervenes between the end of passage 62 and sealing groove 63, as seen in FIG. 2, and establishes communication between passage 62 and sealing groove 63.

An annular packing, such as an O-ring 65, is disposed in the periphery of seat 18 to seal between the latter and the side wall of recess 16. A second annular packing, such as an O-ring 66, is seated in the rear end face of seat 18 to seal between the latter and bottom wall 17 of recess 16. By using an O-ring type seal for seal 66, the latter will function to resiliently bias the seat toward the opposed face of the gate.

Seats 18 are fixed against rotation by means of dowels 67 which extend between the seats and the bottom walls 17 of the seat recesses to thereby maintain the end of passageway 62 in position for registration with bridging recess 64 when the gate is moved to the flowway-closing position.

In operation, the parts initially will be in the positions illustrated in FIG. 1. Sealant will have been introduced through passages 60, 61 into lower reservoir portion 38b which will elevate lower barrier member 41 to its uppermost position engaging shoulder 39. Sealant introduced into reservoir portion 38b in excess of that necessary to fill this reservoir portion will pass through inlet passage 54 and check valve 56 into upper reservoir portion 38a, forcing barrier member 42 to its uppermost position and compressing spring 44. It will be assumed that the direction of flow through the valve is as indicated by the arrows in FIG. 1, making the left-hand side the downstream side of the valve.

With the valve in the open position illustrated in FIG. 1, all forces across the barriers and the valve itself will be balanced. When the closure member is moved to the flowway-closing position, illustrated in FIG. 2, a pressure differential across the valve will result. The pressure of the fluid on the upstream side will work its way past the upstream side of the gate into chamber 13 and will be exerted through the upper end of upper reservoir portion 38a of the downstream reservoir against the upper surface of upper barrier member 42. The differential pressure across the valve will be exerted against upper barrier member 42 to urge the latter downwardly, this force being supplemented by the pressure of spring 44. This force will be transmitted to the body of sealant between the barrier members which will serve as a hydraulic piston to force lower barrier member 41 downwardly. The difference between the pressure-exposed areas constituting the lower face of barrier member 41 and the upper face thereof will supplement the differential force across this lower barrier member, so that the lower barrier member will be caused to move rapidly downwardly, forcing the sealant contained in the lower reservoir portion 38b through passages 62a and 62 into sealant groove 63.

Should the volume of sealant in lower reservoir portion 38b be insufficient to fill the sealant groove, the sealant in upper reservoir portion 38a will be forced by upper barrier member 42 through outlet passage 55 and check valve 57 into lower reservoir portion 38b thence through passages 62a and 62 into groove 63.

When the closure is moved back to the flowway-opening position of FIG. 1, bridging recess 64 will move out of registration with the end of passage 62 and groove 63, cutting off further flow of sealant to the sealing groove. Also, the pressure forces across the valve will be balanced, allowing lower barrier member 41 to move upwardly under the pressure of spring 50 until it again engages shoulder 39. Although spring 50 is weaker than spring 44, this movement can occur because sealant will be displaced through outlet passage 55 into lower reservior portion 38b, and will thereby re-position the parts as shown in FIG. 1.

It will be evident that the illustrative arrangement for supplying sealant to both reservoir portions wherein sealant is introduced through passages 60, 61 via a single external supply fitting into lower reservoir portion 38b and thence through inlet passageway 54 into upper reservoir portion 38a, may be modified, as by providing separate sealant supply ducts to the respective reservoir portions and eliminating inlet passage 54 from lower barrier member 41.

It will be understood that various other changes and modifications may be made in the details of the illustrative embodiment within the scope of the appended claims but without departing from the spirit of the invention.

What I claim and desire to secure by Letters Patent is:

1. An automatic plastic-sealed valve including a housing having a flowway therethrough, a closure member for the flowway movable between positions opening and closing the flowway, a seat in the flowway engageable by the closure member, a full-port sealant groove disposed about the flowway between the seat and the closure member, a sealant reservoir in the housing having one end in communication with the interior of the housing, passage means arranged to connect the other end of the reservoir with said sealant groove in the flowway-closing position of said closure member, upper and lower spaced apart barrier members slidably disposed in said reservoir between the ends thereof, means biasing said barrier members toward each other, means limiting movement of the lower barrier member toward the upper barrier member, a passageway through the lower barrier member communicating the reservoir portion between the barrier members with the reservoir portion below the lower barrier member, and means for introducing sealant into both said reservoir portions, said lower barrier member having at least a portion of its lower face subject to downstream pressure whereby the product of the pressure acting on the area of its upper face is greater than the product of the pressure acting on the area of said lower face.

2. An automatic plastic-sealed valve including a housing having a flowway therethrough, a closure member for the flowway movable between positions opening and closing the flowway, a seat in the flowway engageable by the closure member, a full-port sealant groove disposed about the flowway between the seat and the closure member, a sealant reservoir in the housing having one end in communication with the interior of the housing, passage means arranged to connect the other end of the reservoir with said sealant groove in the flowway-closing position of said closure member, upper and lower spaced apart barrier members slidably disposed in said reservoir between the ends thereof, means biasing said barrier members toward each other, means limiting movement of the lower barrier member toward the upper barrier member, first and second spaced passageways through the lower barrier member communicating the reservoir portion between the barrier members with the reservoir portion below the lower barrier member, oppositely acting check valves in said passageways, and means for introducing sealant into the reservoir portion below said lower barrier member, said lower barrier member having at least a portion of its lower face subject to downstream pressure whereby the product of the pressure acting on the area of its upper face is greater than the product of the pressure acting on the area of said lower face.

3. An automatic plastic-sealed valve including a housing having a flowway therethrough, a closure member for the flowway movable between positions opening and closing the flowway, a seat in the flowway engageable by the closure member, a full-port sealant groove disposed about the flowway between the seat and the closure member, a sealant reservoir vertically disposed in the housing having its upper end in communication with the interior of the housing, passage means arranged to connect the lower end of the reservoir with said sealant groove in the flowway-closing position of said closure member, upper and lower spaced apart barrier members slidably disposed in said reservoir between the ends thereof, means biasing said barrier members toward each other, means limiting movement of the lower barrier member toward the upper barrier member, a passageway through the lower barrier member communicating the reservoir portion between the barrier members with the reservoir portion below the lower barrier member, said lower barrier member having a tubular downward extension of lesser area than said lower barrier member, a cylindrical socket in the lower end wall of said reservoir slidably receiving said extension, a cylindrical plug member having one end seated against the bottom of said socket and the other end slidably received in the bore of said extension and sealing therewith, said means biasing the lower barrier member toward the upper barrier member comprising spring means disposed in said bore in compression between the lower barrier member and said plug member, and means for introducing sealant into both said reservoir portions.

4. An automatic plastic-sealed valve including a housing having a flowway therethrough, a closure member for the flowway movable between positions opening and closing the flowway, spaced seats in the flowway engageable by opposite faces of the closure member, a full-port sealant groove disposed about the flowway between each seat and the opposed face of the closure member, a pair of sealant reservoirs in the housing each having one end in communication with the interior of the housing, passage means arranged to connect the other ends of the reservoir with the related sealant grooves in the flowway-closing position of said closure member, upper and lower spaced apart barrier members slidably disposed in each of said reservoirs between the ends thereof, means biasing said barrier members toward each other, means limiting movement of the lower barrier member toward the upper barrier member, a passageway through the lower barrier member communicating the reservoir portion between the barrier members with the reservoir portion below the lower barrier member, and means for introducing sealant into both said reservoir portions, said lower barrier member having at least a portion of its lower face subject to downstream pressure whereby the product of the pressure acting on the area of its upper face is greater than the product of the pressure acting on the area of said lower face.

References Cited by the Examiner
UNITED STATES PATENTS
3,095,004    6/63    Jackson et al. _____ 137—246.12 XR ISADOR WEIL, *Primary Examiner.*